United States Patent
Tang (10) Patent No.: US 10,810,467 B2
(45) Date of Patent: Oct. 20, 2020

(54) FLEXIBLE INTEGRATING RECOGNITION AND SEMANTIC PROCESSING

(71) Applicant: Hong Kong Applied Science and Technology Research Institute Company Limited, Hong Kong (HK)

(72) Inventor: Wai Kai Arvin Tang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 75 days.

(21) Appl. No.: 16/191,501

(22) Filed: Nov. 15, 2018

(65) Prior Publication Data

US 2019/0156156 A1 May 23, 2019

Related U.S. Application Data

(60) Provisional application No. 62/588,199, filed on Nov. 17, 2017.

(51) Int. Cl.
*G06K 9/62* (2006.01)
*G06K 9/46* (2006.01)
*G06K 9/72* (2006.01)

(52) U.S. Cl.
CPC .......... *G06K 9/6262* (2013.01); *G06K 9/46* (2013.01); *G06K 9/6267* (2013.01);
(Continued)

(58) Field of Classification Search
None
See application file for complete search history.

(56) References Cited

U.S. PATENT DOCUMENTS 5,542,006 A * 7/1996 Shustorovich ........... G06K 9/32
382/156
9,798,943 B2 10/2017 Collet et al.
(Continued)

FOREIGN PATENT DOCUMENTS

CN 103942550 A 7/2014

OTHER PUBLICATIONS

CN103942550A Scene text recognition method based on sparse coding characteristics; Wang et al date: Jul. 2014 (Year: 2014).*
(Continued)

*Primary Examiner* — Nancy Bitar
(74) *Attorney, Agent, or Firm* — Idea Intellectual Limited; Margaret A. Burke; Sam T. Yip (57) ABSTRACT

A method for character recognition and semantic for natural language processing comprising extracting a sequence of feature vectors from a sequence of input character images by a convolutional neural network (CNN) feature extractor. The sequence of feature vectors comprises a plurality of feature vectors, each feature vector representing an approximate-match of its corresponding input character in the sequence of input character images. The method further comprises applying a sequential classifier sequentially as a sliding window of a size of a plurality consecutive feature vectors upon the sequence of feature vectors from a first feature vector in the sequence of feature vectors to the last feature vector in the sequence of feature vectors; and recognizing an output character for a targeted feature vector among the applied-upon consecutive feature vectors within the sliding window as it is sliding across the sequence of feature vectors.

18 Claims, 7 Drawing Sheets

(52) U.S. Cl.
CPC ........... *G06K 9/4619* (2013.01); *G06K 9/726* (2013.01); *G06K 2209/01* (2013.01)

(56) References Cited

U.S. PATENT DOCUMENTS

| | | | |
|---|---|---|---|
| 9,898,187 B2* | 2/2018 | Xia | G06F 3/04883 |
| 10,007,863 B1* | 6/2018 | Pereira | G06K 9/4671 |
| 10,127,478 B2* | 11/2018 | Tsutsui | G06F 40/279 |
| 10,228,846 B2* | 3/2019 | Dixon | G06F 3/0481 |
| 10,424,087 B2* | 9/2019 | Risser | G06T 11/00 |
| 2015/0286873 A1* | 10/2015 | Davis | G06F 1/1694 |
| | | | 382/103 |
| 2017/0017835 A1* | 1/2017 | Dolfing | G06N 20/00 |
| 2017/0364744 A1* | 12/2017 | Savchenkov | G06T 7/13 |
| 2018/0137350 A1* | 5/2018 | Such | G06N 3/0445 |

OTHER PUBLICATIONS

International Search Report of PCT/CN2018/116014 dated Jan. 30, 2019.

Renan G, Maidana et. al., "Deep Neural Networks for Handwritten Chinese Character Recognition", Brazilian Conference on Intelligent Systems, 2017, p. 192-197.

Arik Poznanski et. al., "CNN-N-Gram for Handwriting Word Recognition", IEEE Conference on Computer Vision and Pattern Recognition (CVPR), 2016, p. 2305-2314.

Bruno Stuner et. al., "Handwriting Recognition Using Cohort of LSTM and Lexicon Verification with Extremely Large Lexicon", Pattern Recognition, 2017, p. 1-31.

Yuhao Zhang, "Deep Convolutional Network for Handwritten Chinese Character Recognition", 2017, p. 1-8.

* cited by examiner

FLEXIBLE INTEGRATING RECOGNITION AND SEMANTIC PROCESSING

CROSS-REFERENCES TO RELATED APPLICATIONS

This application claims priority to U.S. Patent Application No. 62/588,199 filed Nov. 17, 2017; the disclosure of which is incorporated by reference in its entirety.

FIELD OF THE INVENTION

The present invention relates generally to methods and systems of language character recognition, and particularly handwritten character recognition.

BACKGROUND OF THE INVENTION

Handwriting recognition is a vital function in modern societies as it is most often a prerequisite in automating various mundane manual tasks such as identifying name, postal addresses, and other information on e.g. the many filled-in forms, bank checks, mail, etc. Although optical character recognition (OCR) has received much attention and development in the last decades, it still remains a challenging problem due to the presence of cursive writing, touching strokes, and confusion in shapes. This is especially true in written languages with pictorial character origins, such as Chinese.

Most of the existing recognition or classification deep learning models are designed to perform individually on a single input character. In cases where input characters appear sequentially and form different meaning based on the connectivity, e.g., characters becoming words and words becoming phrases, most of the existing techniques ignored the mutual relationship in the recognition stage or the classification stage. Existing techniques tackle this problem by adding an additional stage called semantic or natural language processing (NLP) to introduce the relationship back to correct any error. However, errors may not be easily corrected in the NLP stage.

The most proposed approaches required developers to use a completely new architecture based on a convolutional neural network (CNN), which requires trainings, which entail the design and preparation of training dataset. Nonetheless, these CNN-based techniques recognize a single word at a time by using a classifier of one feature vector only. The paper: Maidana et al., *Deep Neural Networks for Handwritten Chinese Character Recognition*, 2017 *Brazilian Conference on Intelligent Systems (BRACIS)*, IEEE, October 2017 provides details of such CNN-based recognition techniques; the disclosure of which is incorporated herein by reference in its entirety.

Figure 1:
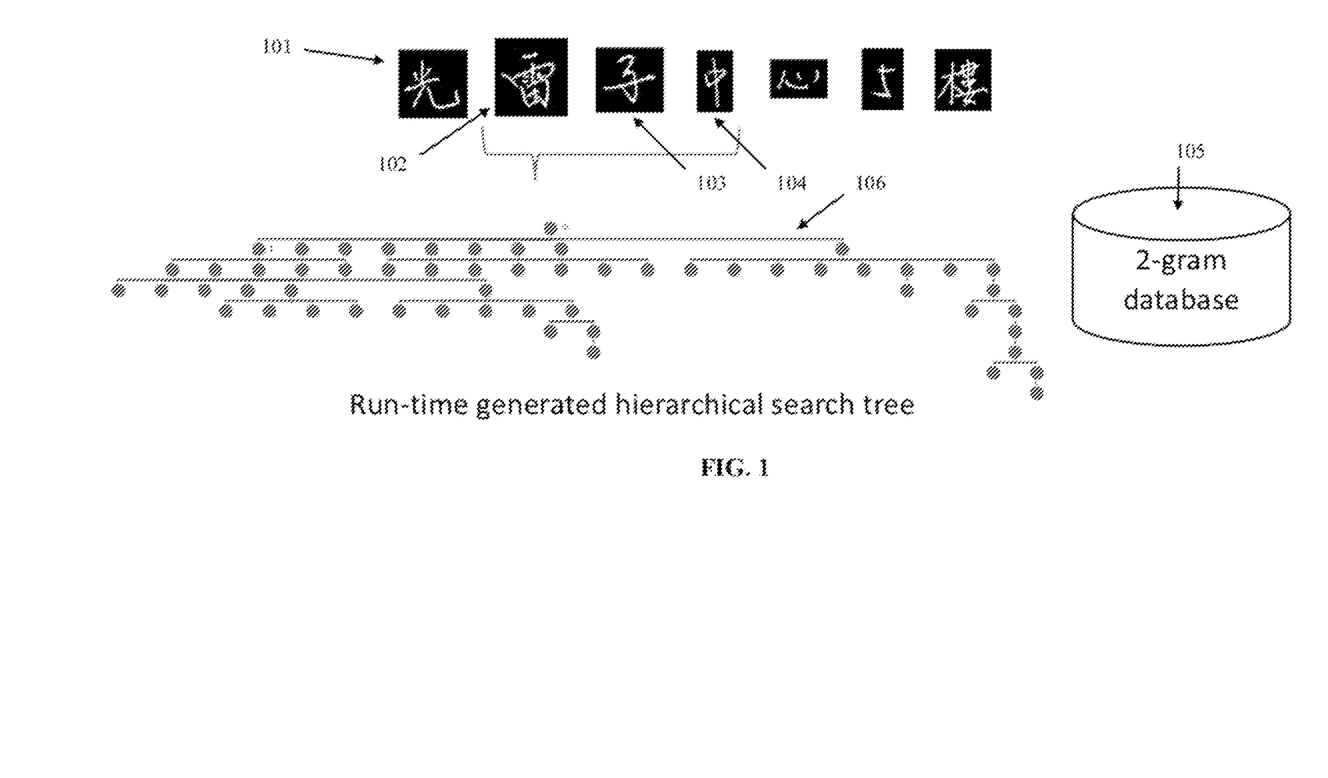
FIG. 1 illustrates the basic principle of an NLP N-gram modeling recognition system.

An existing recognition system is based on the N-gram modeling technique. The basic working principle of the N-gram modeling recognition system is to take N number of consecutive input characters immediately preceding or following the targeted input character along with the hypotheses of the targeted input character for conducting an approximate-matching in a N-gram lexicon database. For the recognition to achieve acceptable accuracy, the N-gram lexicon database is necessarily large in size. The run-time approximate-matching involves building a hierarchical search tree, which is also resource intensive. Further, such hierarchical searches are not easily parallelized as each search is influenced by prior search results, necessitating the searches being done sequentially. FIG. 1 illustrates the basic working principle of an NLP N-gram modeling recognition system, in which a string of input character 101 is being recognized by a 2-gram recognition system. The targeted input character 102 and the two immediately following characters 103 and 104 are taken for a search and approximate-matching in a 2-gram database 105. The search builds a hierarchical search tree 106 to reach the resulting node.

Yet another existing type of recognition system is based on the recurrent neural network (RNN). The RNN is trained using training dataset containing character phrases and vocabularies of a known context. Although these RNN-based recognition systems are relatively simple in terms of logical structure and operation, because the training datasets are rather limited, recognition accuracy tends to suffer especially when the system encounters inputs that are outside of the training datasets. Also, artificially generated training datasets lose realism as realistic training data on rare characters are difficult to obtain. With more variable parameters in the training datasets, the complexity of the training increases quickly. Depending on the size of the training datasets, recognition performance and accuracy varies widely.

SUMMARY OF THE INVENTION

The present invention provides a method and an apparatus for language character recognition and semantic, which can be incorporated in various NLP methods and systems. It is the objective of the present invention to provide a method of handwritten language character recognition that is more accurate and less computing resource consuming than those based on the traditional techniques. In accordance to one embodiment of the present invention, provided is a method that integrates both the recognition stage and the semantic stage into one single step. The stage-integration comprises a disassembly of a pre-trained CNN into two logical components: a feature extractor and a sequential classifier.

The sequential classifier is trained and/or designed based on context, function, and/or application domain (e.g. language, geographical scope, business fields, etc.) with context, function, and/or application domain specific statements, vocabularies, and jargons. In one preferred embodiment, the training dataset of handwritten statements, vocabularies, and jargons are represented by feature vectors, and the training of the sequential classifier constructs a character feature hyperspace. The sequential classifier can be retrained and/or redesigned with relative ease and speediness, while the more complex and resource intensive feature extractor is reusable across multiple contexts, functions, and application domains.

In accordance to one embodiment, the feature extractor is a CNN-based character feature extractor. Before run-time, it is to be first trained with a training dataset containing the selected language characters of a useable number (e.g. 10,000 characters) and images of different handwriting styles and/or forms of each character of a useable number (e.g. 300 images per character). At run-time, an input character string is fed to the feature extractor in which a sequence of character images approximate-matching the characters in the input character string are determined. From the sequence of matching character images, a sequence of the feature vectors is extracted. The sequential classifier is then sequentially applied to the sequence of the feature vectors as a sliding window of a size of a plurality of consecutive feature vectors. The 'sliding' of the window can be in the forward or backward direction along the feature vector sequence.

In accordance to one embodiment, the size of the sliding window of the sequential classifier is at least two. The sliding window focuses on any one targeted feature vector along with its adjacent feature vector(s) being the at least two consecutive feature vectors (or characters) window. As such, the sequential classifier recognizes the one character corresponding to the targeted feature vector and generate the output character by one of: bi-inferencing from both its immediately preceding consecutive feature vector(s) and immediately following consecutive feature vector(s); forward-inferencing from its immediately following consecutive feature vector(s); and backward-inferencing from its immediately preceding consecutive feature vector(s).

In accordance to another embodiment, the size of the sliding window of the sequential classifier is three. The sliding window centers on one targeted feature vector with its immediately preceding feature vector and its immediately following feature vector being the three consecutive feature vectors (or characters) window. As such, the sequential classifier recognizes the character corresponding to the targeted feature vector and generates the output character by bi-inferencing from both its immediately preceding feature vector and immediately following feature vector.

In accordance to various embodiments, other sizes of the sliding window are possible. In general, however, the shorter the window, the less accurate of the character recognition; on the other hand, the longer the window, the larger the training dataset and the higher number of dimensions of possible solutions in the character feature hyperspace. The relationships between the feature vectors (or characters) can also be easily defined in the sequential classifier. In the exemplary case of the sliding window consisting of three feature vectors (or characters), the relationships can be bi-inference—recognizing the middle character by inferencing from both the immediately preceding feature vector and immediately following feature vector; forward-inference—recognizing a character by inferencing from its two immediately following consecutive feature vectors; and backward-inference—recognizing a character by inferencing from its two immediately preceding consecutive feature vectors.

The advantages of the present invention include: faster development on the CNN from recognizing single input characters at a time to sequential input characters; reduced recognition execution time and error correction processing time comparing to traditional NLP N-gram modeling recognition techniques; and the deep learning training on the feature extractor can interoperate with most existing word-by-word handwriting recognition techniques.

BRIEF DESCRIPTION OF THE DRAWINGS

Embodiments of the invention are described in more detail hereinafter with reference to the drawings, in which.

DETAILED DESCRIPTION

In the following description, NLP methods and apparatuses for handwriting recognition, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides a method and an apparatus for language character recognition and semantic, which can be incorporated in various NLP methods and systems. In accordance to one embodiment of the present invention, provided is a method that integrates both the recognition stage and the semantic stage into one single step. The stage-integration comprises a disassembly of a CNN-based recognition system into two logical components: a feature extractor and a sequential classifier.

The sequential classifier is trained and/or designed based on context, function, and/or application domain (e.g. language, geographical scope, business fields, etc.) specific training dataset of statements, vocabularies, and jargons (lexicons). In one preferred embodiment, the training dataset of lexicons are represented by Unicode data strings. This can be achieved by first accessing a context, function, and/or application domain specific lexicon database and cross match the lexicon database records with the records in the feature vector database to obtain the feature vector selections for training the sequential classifier. The training of the sequential classifier constructs a character feature hyperspace. The character feature hyperspace may be implemented in one or more databases and/or file systems local or remote to the sequential classifier's run-time execution computing devices and/or servers. At design time, the sequential classifier can be retrained and/or redesigned with relative ease and speediness, while the more complex and resource intensive feature extractor is reusable across multiple contexts, functions, and application domains.

In accordance to one embodiment, the feature extractor is a CNN-based character feature extractor. At design time, it is trained with a training dataset containing the selected language characters of a useable number (e.g. 10,000 characters) and images of different handwriting styles and/or forms of each character of a useable number (e.g. 300 images per character). In one embodiment, the training dataset of character images are represented by Unicode data strings, and the training of the feature extractor constructs a feature vector database. The feature vector database may be implemented in one or more databases and/or file systems local or remote to the feature extractor's run-time execution computing devices and/or servers.

Figure 3:
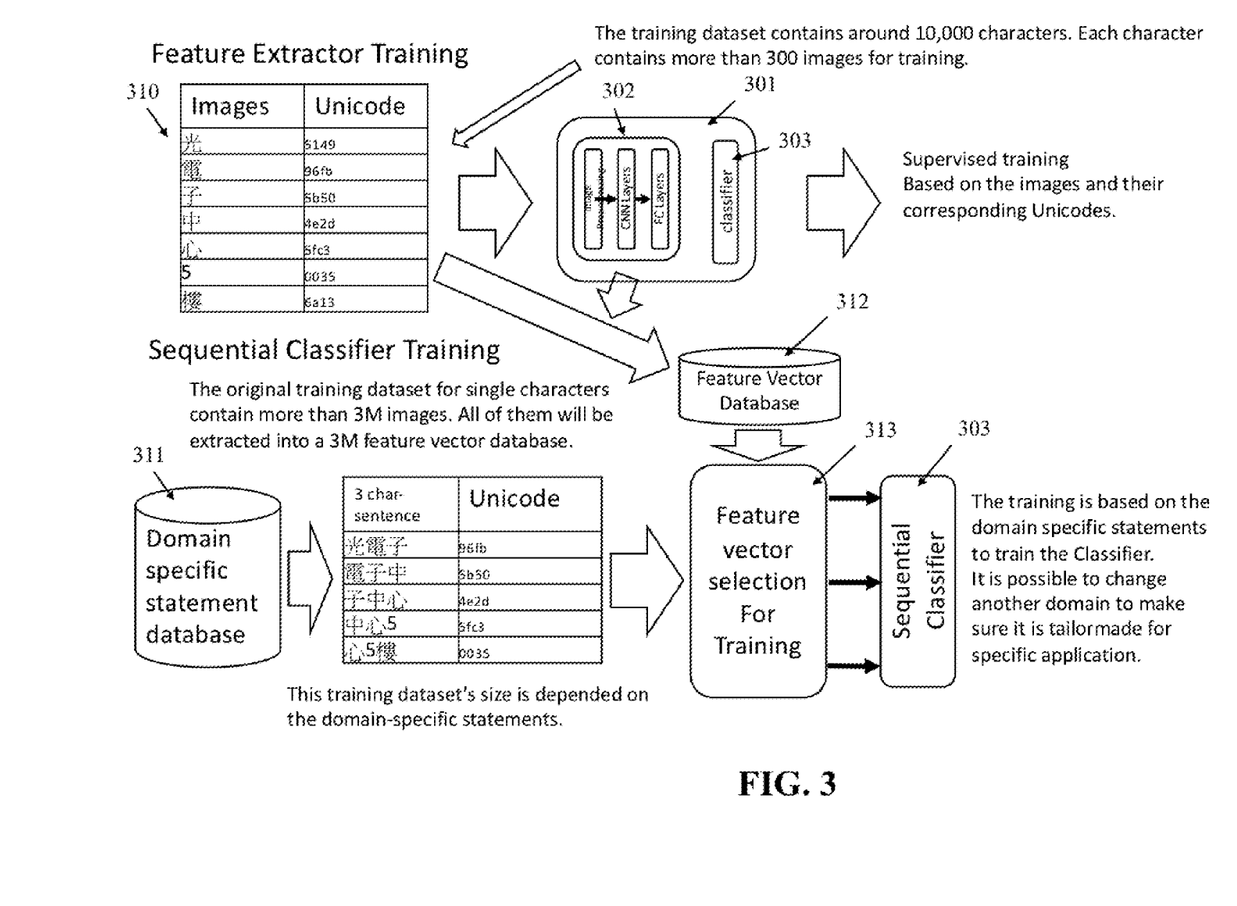
FIG. 3 illustrates the training strategy of a CNN-based recognition system in accordance to one embodiment of the present invention.
Figure 4A:
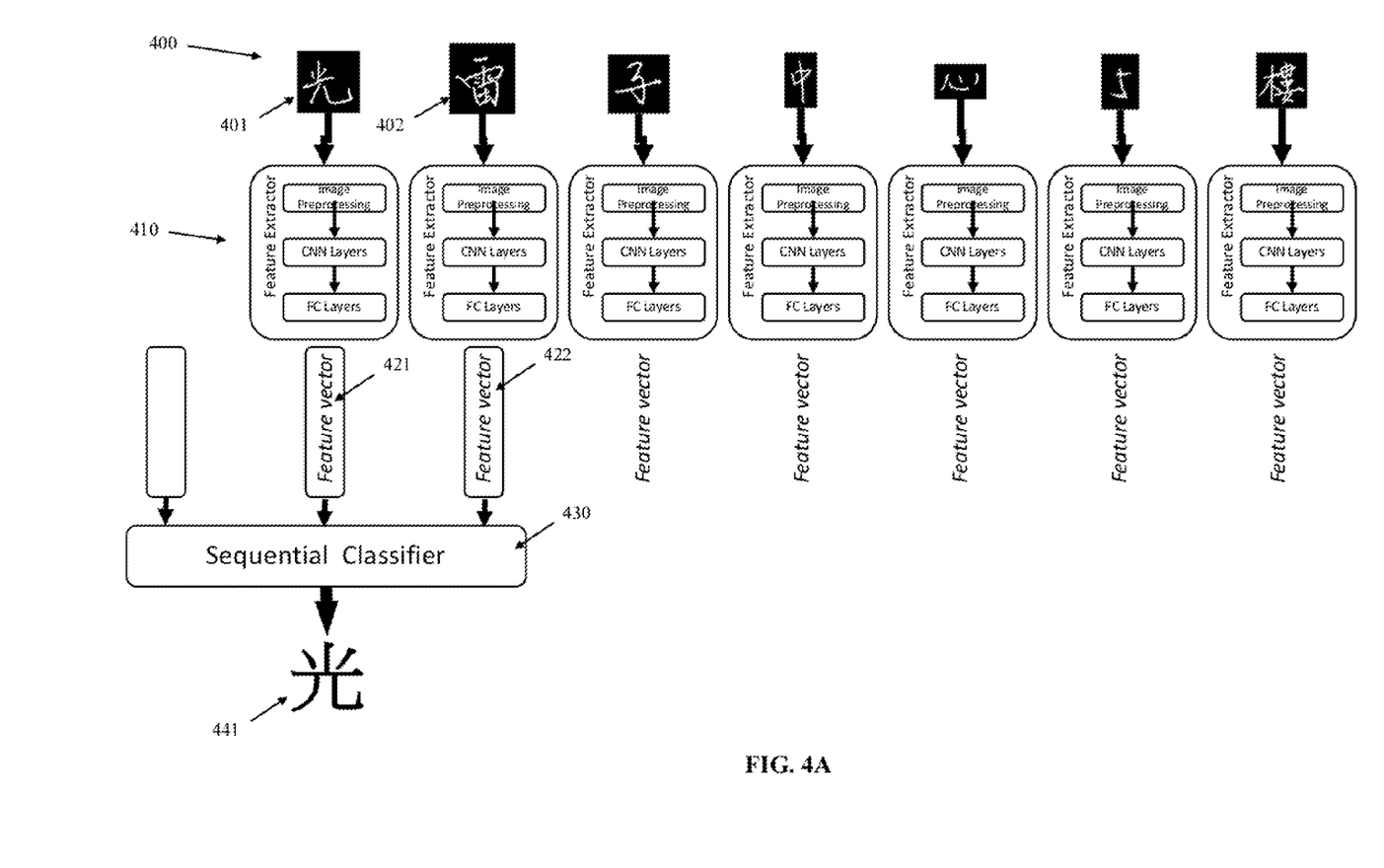
FIGS. 4A, 4B, 4C, and 4D illustrate the run-time operation of the integrated recognition-semantic stage of a CNN-based recognition system in accordance to one embodiment of the present invention; with FIG. 4A illustrating the recognition of the first character in a sentence, FIG. 4B illustrating the recognition of the second character in the sentence, FIG. 4C illustrating the recognition of the third character in the sentence, and FIG. 4D illustrating the recognition of the fourth character in the sentence.
Figure 4B:
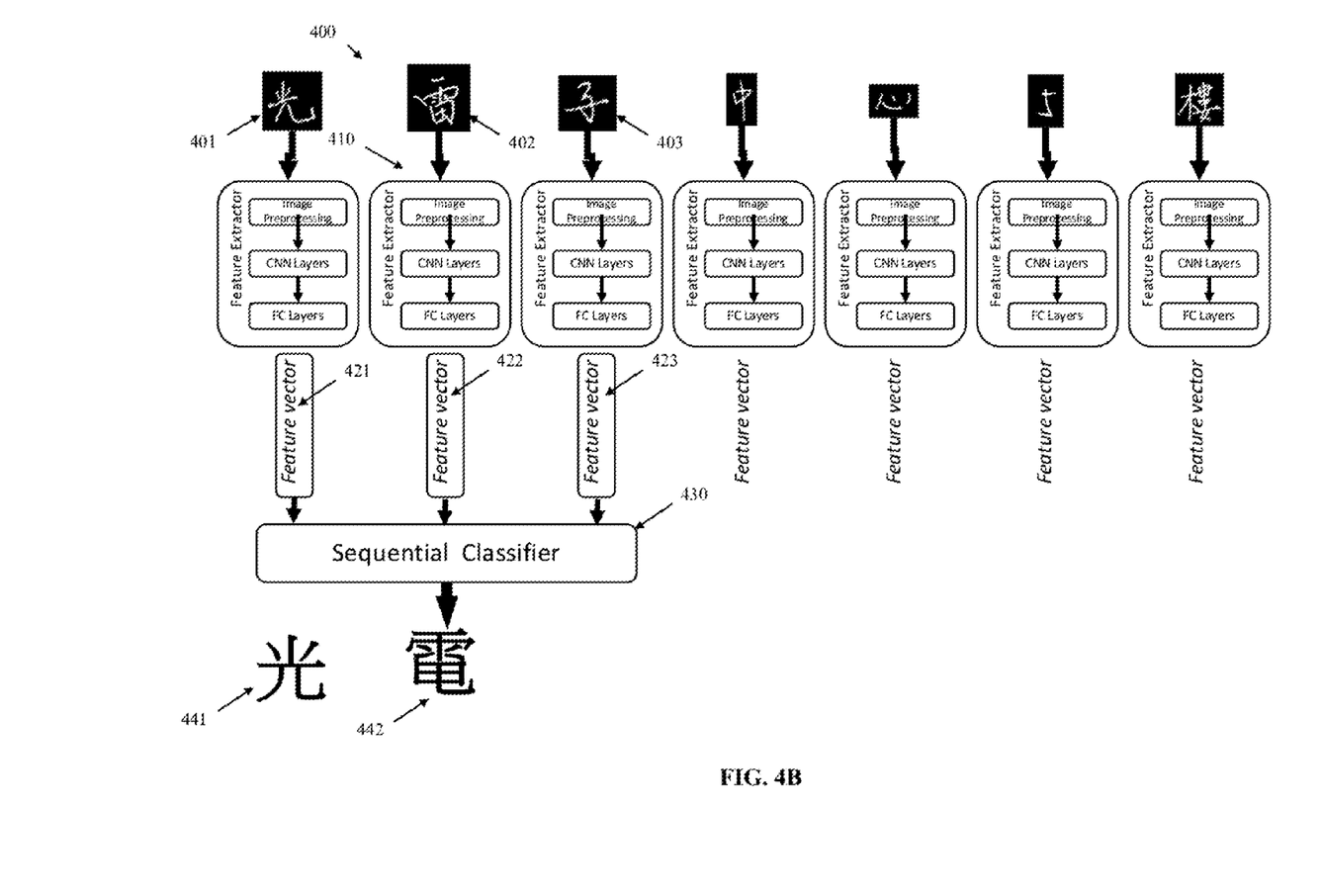
Figure 4C:
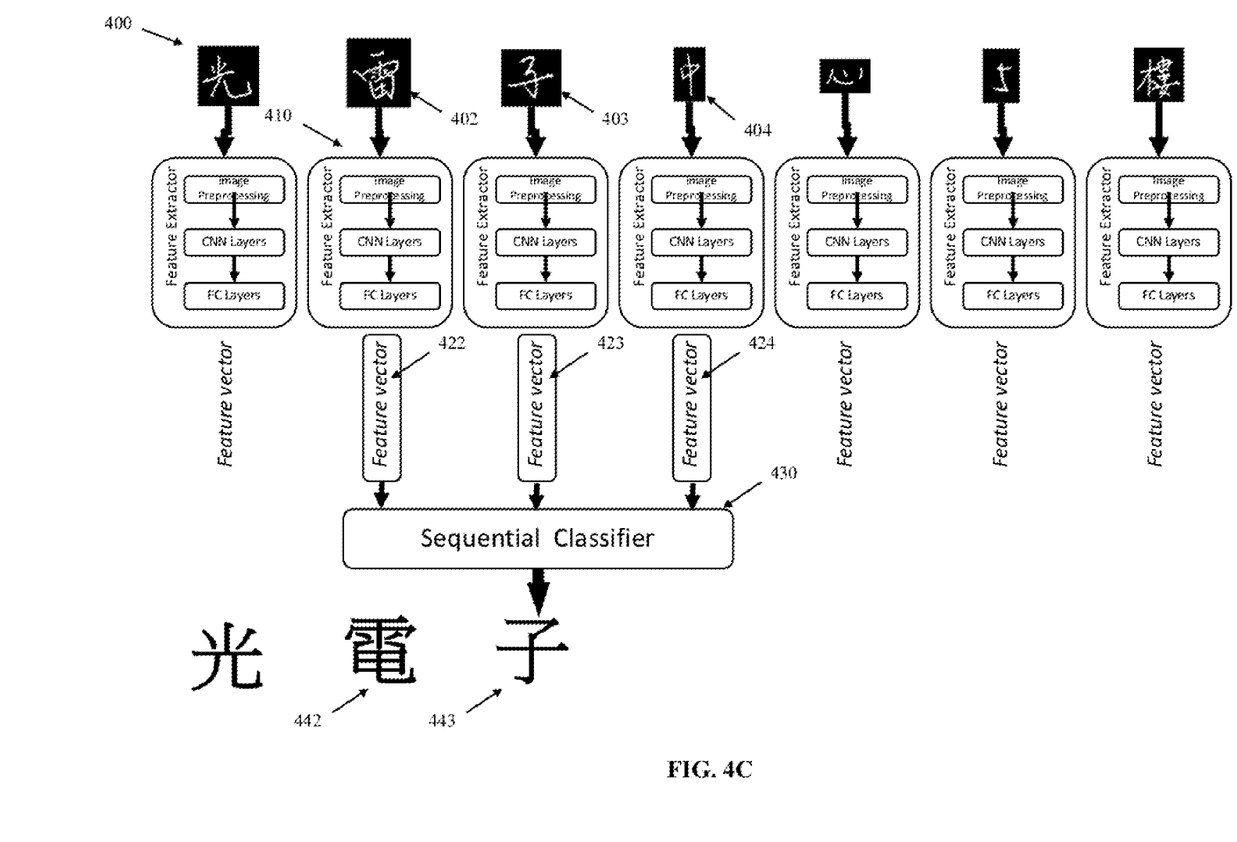
Figure 4D:
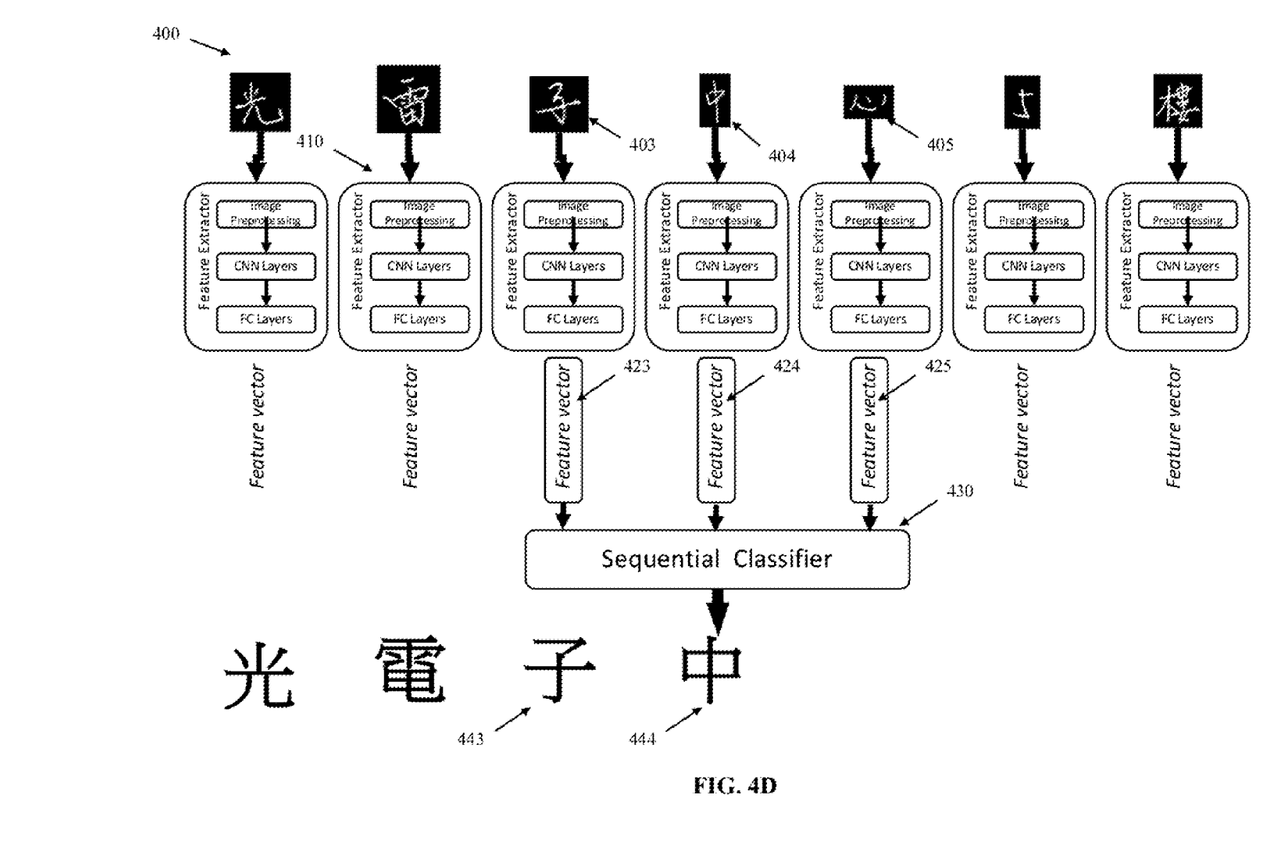

FIG. 3 illustrates the training strategy of the feature extractor and the sequential classifier of a three-character sliding window. A training dataset containing the selected language characters of 10,000 characters and 300 images of different handwriting style/form of each character and their corresponding Unicode data strings are used to train the feature extractor 302 of the integrated recognition-semantic stage 301. The result is a feature vector database 312, which can also be used to generate the training dataset for the sequential classifier 303. To train the sequential classifier 303, a context, function, and/or application domain specific lexicon database 311 is accessed and cross match the lexicon database records with the records in the feature vector database 312 to obtain the feature vector selections 313 for training the sequential classifier 303.

Figure 2:
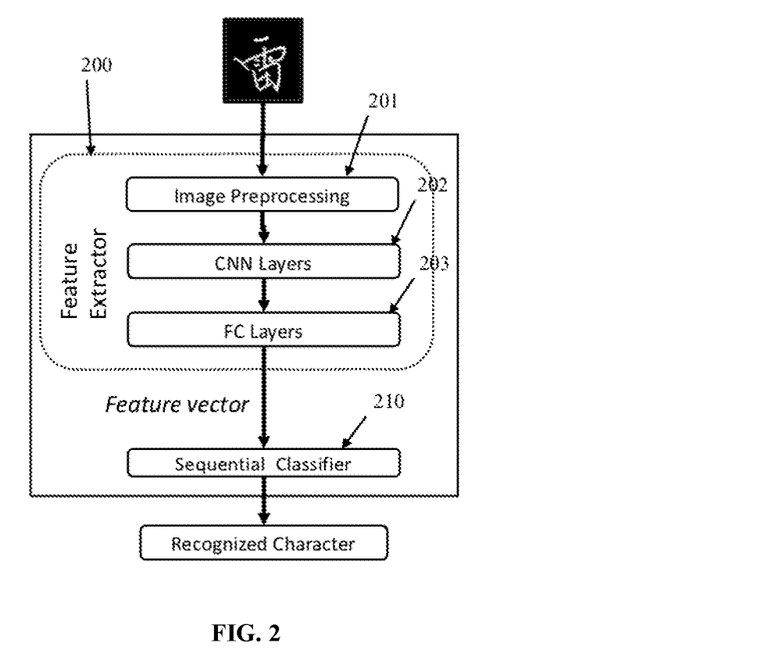
FIG. 2 depicts a simplified logical structural and dataflow diagram of the integrated recognition-semantic stage of a CNN-based recognition system in accordance to one embodiment of the present invention.

FIG. 2 depicts a simplified logical structural and dataflow diagram of the integrated recognition-semantic stage of a CNN-based recognition system. The feature extractor 200 comprises an image processing layer 201 for image-processing (which may include noise filtering, irrelevant handwriting stroke removal, contrast enhancement, and smoothness enhancement) each input handwritten character; a CNN layer 202 followed by a fully connected (FC) layer 203 for analyzing and extracting the character characteristics by removing the individual writing style characteristics of the image-processed input handwritten character. The result generated from the FC layer 203 is a feature vector of a character represented in the character feature hyperspace for further processing by the sequential classifier 210.

At run-time, an input character string, or a sentence, is fed to the feature extractor in which a sequence of character images approximate-matching the characters in the input character string are determined. From the sequence of matching character images, a sequence of the feature vectors is extracted. The sequential classifier is then successively applied to the sequence of the feature vectors as a sliding window of a size of a plurality of consecutive feature vectors. The 'sliding' of the window can be in the forward or backward direction along the feature vector sequence.

In accordance to one embodiment, the size of the sliding window of the sequential classifier is at least two. The sliding window focuses on any one targeted feature vector with its adjacent feature vector(s) being the at least two consecutive feature vectors (or characters) window. As such, the sequential classifier recognizes the one character corresponding to the targeted feature vector and generate the output character by one of: bi-inferencing from both its immediately preceding consecutive feature vector(s) and immediately following consecutive feature vector(s); forward-inferencing from its immediately following consecutive feature vector(s); and backward-inferencing from its immediately preceding consecutive feature vector(s).

In accordance to another embodiment, the size of the sliding window of the sequential classifier is three. The sliding window centers on one targeted feature vector with its immediately preceding feature vector and its immediately following feature vector being the three consecutive feature vectors (or characters) window. As such, the sequential classifier recognizes the character corresponding to the targeted feature vector by bi-inferencing from both the immediately preceding feature vector and immediately following feature vector through the sequential classifier's character feature hyperspace. More precisely, the sequential classifier recognizes the middle character by approximate-locating the recognized middle character through the sequential classifier's character feature hyperspace using the multi-dimensional coordinate formed by the three feature vectors.

In accordance to various embodiments, other sizes of the sliding window are possible. In general, however, the shorter the window, the less accurate of the character recognition; on the other hand, the longer the window, the larger the training dataset and the higher number of dimensions of the possible solutions in the character feature hyperspace. The relationships between the feature vectors (or characters) can also be easily defined in the sequential classifier. In the case of the sliding window consisting of three feature vectors (or characters), the relationships can be bi-inference—recognizing the middle character by inferencing from both the immediately preceding feature vector and immediately following feature vector; forward-inference—recognizing a character by inferencing from its two immediately following consecutive feature vectors; and backward-inference—recognizing a character by inferencing from its two immediately preceding consecutive feature vectors.

Referring to FIGS. 4A, 4B, 4C, and 4D, which illustrate the run-time operation of the integrated recognition-semantic stage of a CNN-based recognition system in accordance to one embodiment of the present invention. The sequential classifier 430 of this integrated recognition-semantic stage employs a three-character sliding window with the middle character being the targeted input character in each sequential character recognition. The handwritten sentence 400 is taken as input to the feature extractor 410 for approximate-matching and extraction of a sequence of feature vectors. The sliding window of the sequential classifier 430 processes the first three feature vectors. However, at the boundary, since the sliding window is centered on the first feature vector 421, only the immediately following feature vector 422 is taken by the sequential classifier 430 for inference and locating the character 441 in its character feature hyperspace. As the sliding window continues to 'slide' through the sequence of feature vectors, the sliding window next centers on the second feature vector 422, and both the first feature vector 421 and the third feature vector 423 are taken by the sequential classifier 430 for inference and locating the character 442 in its character feature hyperspace. Subsequently, as the sliding window next centers on the third feature vector 423, both the second feature vector 422 and the fourth feature vector 424 are taken by the sequential classifier 430 for inference and locating the character 443 in its character feature hyperspace. Still, as the sliding window next centers on the fourth feature vector 424, both the third feature vector 423 and the fifth feature vector 425 are taken by the sequential classifier 430 for inference and locating the character 444 in its character feature hyperspace.

The electronic embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the electronic embodiments may be executed in one or more general purpose or computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAIVIs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for character recognition and semantic for natural language processing comprising:
   receiving an input character string comprising a plurality of input characters;
   determining a sequence of input character images approximate-matching the input characters;
   extracting a sequence of feature vectors from the sequence of input character images by a convolutional neural network (CNN) based feature extractor, wherein the sequence of feature vectors comprising a plurality of feature vectors, each feature vector representing an approximate-match of its corresponding input character in the sequence of input character images;
   applying successively a sequential classifier sequentially as a sliding window of a size of a plurality of consecutive feature vectors upon each of the feature vector as a targeted feature vector in the sequence of feature vectors, wherein the size of the sliding window is at least two consecutive feature vectors; and
   recognizing by the sequential classifier an output character for the targeted feature vector within the sliding window, the recognition comprising:
      inferencing from the feature vector adjacent to the targeted feature vector; and
      locating the output character in a character feature hyperspace using the applied-upon consecutive feature vectors; and
   moving the sliding window through the sequence of feature vectors after recognizing the output character such that sequential classifier is applied to each of the feature vectors as a targeted feature vector in the sequence of feature vectors to recognize an output character for each targeted feature vector.

2. The method of claim 1, wherein the size of the plurality consecutive feature vectors of the sliding window is at least three feature vectors.

3. The method of claim 2,
   wherein the targeted feature vector is a middle feature vector of each applied-upon consecutive feature vectors within the sliding window; and
   wherein the recognition by the sequential classifier an output character for the targeted feature vector within the sliding window further comprising:
      bi-inferencing from the consecutive feature vectors immediately preceding the targeted feature vector and consecutive feature vectors immediately following the targeted feature vector.

4. The method of claim 1, wherein the sliding window slides forward on the sequence of feature vectors from a beginning feature vector of the sequence of feature vectors to an end feature vector of the sequence of feature vectors.

5. The method of claim 1, wherein the sliding window slides backward on the sequence of feature vectors from an end feature vector of the sequence of feature vectors to a beginning feature vector of the sequence of feature vectors.

6. The method of claim 1, wherein the sequential classifier is trained using a context, function, or application domain specific training dataset of lexicons.

7. The method of claim 1, where the CNN-based feature extractor is trained using a training dataset containing a plurality of selected language characters and a plurality of images of different handwriting styles or forms of each character.

8. An apparatus for character recognition and semantic for natural language processing comprising:
   a CNN-based feature extractor configured for:
      receiving an input character string comprising a plurality of input characters;
      determining a sequence of input character images approximate-matching the input characters; and
      extracting a sequence of feature vectors from the sequence of input character images, wherein the sequence of feature vectors comprising a plurality of feature vectors, each feature vector representing an approximate-match of its corresponding input character in the sequence of input character images; and
   a sequential classifier configured for:
      applying successively a sliding window of a size of a plurality of consecutive feature vectors upon each of the feature vector as a targeted feature vector in the sequence of feature vectors, wherein the size of the sliding window is at least two consecutive feature vectors;
      recognizing an output character for the targeted feature vector within the sliding window, the recognition comprising:
         inferencing from the feature vector adjacent to the targeted feature vector;
         locating the output character in a character feature hyperspace using the applied-upon consecutive feature vectors;
      moving the sliding window through the sequence of feature vectors after recognizing the output character such that sequential classifier is applied to each of the feature vectors as a targeted feature vector in the sequence of feature vectors to recognize an output character for each targeted feature vector.

9. The apparatus of claim 8, wherein the size of the plurality consecutive feature vectors of the sliding window is at least three feature vectors.

10. The apparatus of claim 9,
   wherein the targeted feature vector is a middle feature vector of each applied-upon consecutive feature vectors within the sliding window; and
   wherein the recognition by the sequential classifier an output character for the targeted feature vector within the sliding window further comprising:
      bi-inferencing from the consecutive feature vectors immediately preceding the targeted feature vector and consecutive feature vectors immediately following the targeted feature vector.

11. The apparatus of claim 8, wherein the sliding window slides forward on the sequence of feature vectors from a beginning feature vector of the sequence of feature vectors to an end feature vector of the sequence of feature vectors.

12. The apparatus of claim 8, wherein the sliding window slides backward on the sequence of feature vectors from an end feature vector of the sequence of feature vectors to a beginning feature vector of the sequence of feature vectors.

13. The apparatus of claim 8, wherein the sequential classifier is trained using a context, function, or application domain specific training dataset of lexicons.

14. The apparatus of claim 8, wherein the CNN-based feature extractor is trained using a training dataset containing a plurality of selected language characters and a plurality of images of different handwriting styles or forms of each character.

15. The method of claim 1, wherein the recognition by the sequential classifier an output character for the targeted feature vector within the sliding window further comprising:
    forward-inferencing from the consecutive feature vectors immediately following the targeted feature vector.

16. The method of claim 1, wherein the recognition by the sequential classifier an output character for the targeted feature vector within the sliding window further comprising:
    backward-inferencing from the consecutive feature vectors immediately preceding the targeted feature vector.

17. The apparatus of claim 8, wherein the recognition by the sequential classifier an output character for the targeted feature vector within the sliding window further comprising:
    forward-inferencing from the consecutive feature vectors immediately following the targeted feature vector.

18. The apparatus of claim 8, wherein the recognition by the sequential classifier an output character for the targeted feature vector within the sliding window further comprising:
    backward-inferencing from the consecutive feature vectors immediately preceding the targeted feature vector.

* * * * *